O. H. JEWELL.

FILTER.

No. 11,672. Reissued June 28, 1898.

Witnesses.

Wm. N. Rheem.

Wm. F. Henning

Inventor.

Oman H. Jewell, by Bond, Adams, Richards & Jackson

Att'ys.

UNITED STATES PATENT OFFICE.

OMAR H. JEWELL, OF CHICAGO, ILLINOIS, ASSIGNOR TO THE O. H. JEWELL FILTER COMPANY, OF ILLINOIS.

FILTER.

SPECIFICATION forming part of Reissued Letters Patent No. 11,672, dated June 28, 1898.

Original No. 546,738, dated September 24, 1895. Application for reissue filed September 7, 1897. Serial No. 650,846.

*To all whom it may concern:*

Be it known that I, OMAR H. JEWELL, a citizen of the United States, residing at Chicago, in the county of Cook and State of Illinois, have invented certain new and useful Improvements in Filters; and I do hereby declare the following to be a full, clear, and exact description of the invention, such as will enable others skilled in the art to which it appertains to make and use the same.

This invention relates to improvements in "gravity-filters" of the kind adapted for filtering large masses of water and which are provided with a power-driven agitator for stirring up the filtering material during the process of washing and cleansing the same.

The object of the invention is to provide a filter having the highest efficiency, and which can be constructed and operated at minimum cost for material and labor.

The invention consists, briefly, in combining a filter and subsiding-chamber in one tank or vessel occupying but one foundation and so constructed and arranged relatively that the accumulation of sediment in the subsiding-chamber may be conveniently removed and driven out therefrom by mechanical appliance and without other power or machinery than that found in connection with the agitator, which is thus utilized for this purpose.

The invention further consists in the novel features of construction, combination, and arrangement of parts hereinafter described and set forth, reference being had to the accompanying drawings, in which—

Figure 1:
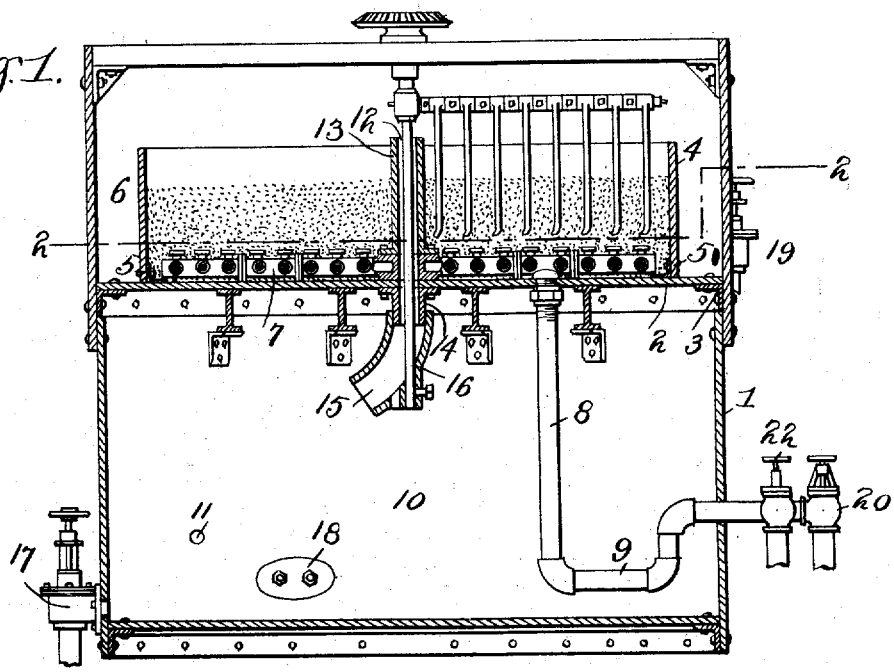
Figure 2:
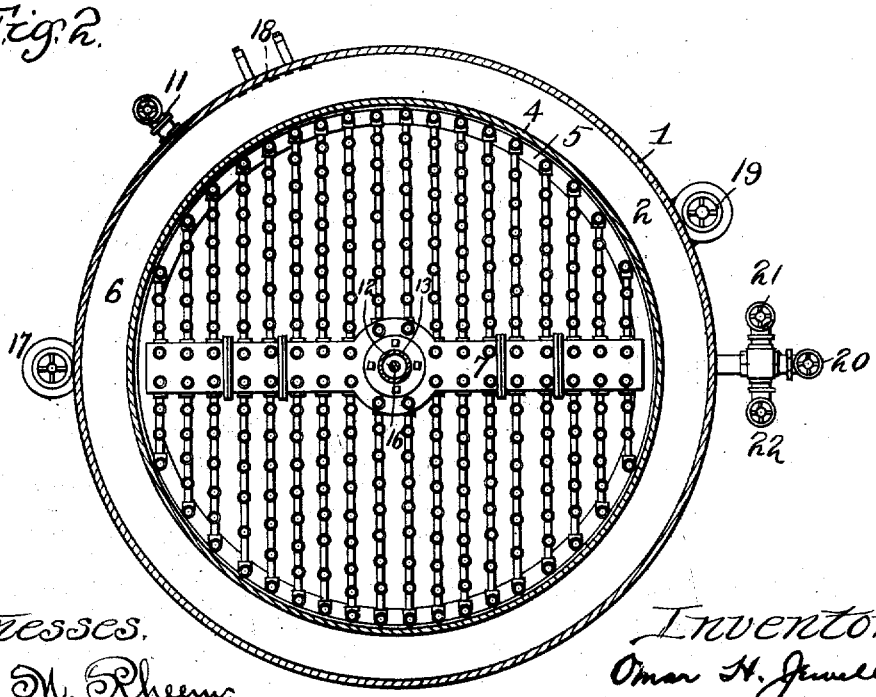

Figure 1 is a vertical central section of a combined filter and subsiding-chamber embodying my invention; and Fig. 2 is a transverse section of the same, taken on the line 2 2 of Fig. 1.

It is to be understood that the parts forming the filter proper, in which are comprised the filter-material tank and agitator, are not fully shown and set forth herein, a patent having been granted for this part of the apparatus to Omar H. Jewell and Ira H. Jewell, No. 509,126, dated November 21, 1893, to which reference is to be had for a more particular description, being practically identical herewith, except as to the requirements for its connection with the subsiding-chamber, and which will be clearly apparent.

A partial disclosure of this present invention has also been made and claimed in an application filed by me March 6, 1895, for improvements in filters, Serial No. 540,789.

Referring to the drawings, 1 designates a cylindrical tank comprising a shell and bottom formed of boiler-iron riveted up and made tight in the usual manner. Said shell or tank is divided transversely midway its length by a partition-plate 2, supported upon an annular ring of angle-iron 3, riveted to the inside of the shell and to said partition-plate and made tight therewith, forming two compartments or tanks, the upper one open at the top and the lower a sealed one. Within said upper tank is located the filter-material tank, the bottom of which is formed by the said partition-plate, to which the shell portion 4 is secured by the angle-iron 5. Said material-tank is formed and set concentric within the main tank, leaving an annular space 6 between said tanks. A filter-water manifold pipe 7, made in sections, extends diametrically across said material-tank upon the bottom thereof with lateral branches upon either side therefrom, the whole provided with screen-covered cup-openings into which the filtered water enters and flows from the manifold down the filtered-water pipe 8 to the water-reservoir outside the tank. Said pipe is provided with a water-trap 9. Said filtered-water pipe is extended some distance below the filter-tank to form a downdraft by removing the air-pressure from the under side of the filter-bed, and thus to make effective the air-pressure upon the water above said bed, and said trap is for the purpose of sealing the lower end of said filtered-water pipe to prevent the air from entering therein above said trap when the flow and velocity of water down the pipe is diminished by the accumulation of impurities in the bed.

10 is the lower tank or compartment, adapted to form a subsiding-chamber into which the unfiltered water flows through the admission valve and opening 11, and to the bottom of which sedimentary particles gravitate and are accumulated. Said subsiding-chamber communicates with the upper filter-tank by means of a central opening 12, formed through the partition-plate, manifold, and pipe 13, the upper end of which extends above the top of the material-tank, the joints between the several parts being formed and made water-tight, so that the unfiltered water can only discharge into or enter the filter-tank through said central opening and from the top of said pipe. Said central opening is extended below the partition-plate by a short pipe 14 secured thereto, upon which an elbow-pipe 15 is loosely fitted to turn thereon. Said elbow is secured to the lower end of the agitator-shaft 16 and is adapted to be rotated therewith, the shaft being extended and carried down through the central opening into the subsiding-chamber for this purpose. The subsiding-chamber is provided with a valve-outlet 17 for removal of sediment therefrom, and with a manhole 18 convenient for construction and repairs, and the filter-tank is provided with a valved outlet 19 at the bottom of the annular space for the discharge of wash-water and for drawing off any sediment deposited therein. The filtered-water pipe is provided with a valve 20 upon the outside of the tank, between which a lateral pipe and valve 21 connects the wash-water-supply stand-pipe or pump therewith, and opposite thereto a lateral pipe with valve 22 discharges into a sewer.

The practical operation is as follows: The unfiltered water is admitted into the subsiding-tank until it is full, and continues to flow therein, passing up the central opening, filling also the filter-tank to the desired height above the material-tank, at which point it is maintained during filtration, the water filtering down and passing through the trap-pipe to the pure-water reservoir, as will be readily understood, and as the subsiding-chamber is comparatively large the sediment has ample time to settle therein. As soon as the water passes into the filter-tank from the subsiding-tank it begins to percolate through the sand or other granular material composing the filter-bed, and after passing through the bed is carried off by the filtered-water pipe 8. When a continuous flow of water is secured through the filtered-water pipe 8, the downdraft exerted by the column of water in said pipe creates and maintains a partial vacuum in the filter-bed, the vacuum being greatest in the lower portion of the bed. The granular filtering material is consequently compacted by atmospheric pressure, the lower part of the bed being compacted more closely than the upper part, the degree of compactness gradually diminishing toward the upper surface of the bed. As the result of this condition of the filter-bed the impurities carried by the water to be filtered are not all collected at the surface of the bed, forming a crust or substantially impervious stratum, as is the case where granular filter-beds of substantially uniform density are used without suction, but only a part of the impurities are removed at the surface, a great portion of the suspended matter, by reason of its being in a more finely-divided state, being permitted to pass the more widely-separated granular particles in the upper portion of the bed to be intercepted afterward by the more closely-compacted particles in the lower portion of the bed. Furthermore, by employing the downdraft, as above described, the upper portion of the filter-bed, which usually contains a comparatively large proportion of the impurities, may be agitated by means of the agitators without interrupting the process of filtration, inasmuch as the lower portion of the bed is maintained in a compact state by the downdraft, preventing the passage of the impurities freed by the agitation of the upper portion of the bed, the partial vacuum maintained by the downdraft acting to prevent the agitation of any part of the bed except that which is directly operated upon by the agitators.

In prior filters where a loose granular filter-bed was used it was impracticable to agitate the filter-bed during filtration, because as soon as the upper crust of the bed was broken by the agitators the impurities would at once be permitted to pass entirely through the bed and be carried off in the filtered water. In my improved filter the agitation of the bed may be repeated as often as may be desired, or it may be continuous, thereby permitting the mass of the impurities to penetrate further into the bed until the entire bed becomes saturated with impurities, when it is necessary to wash the bed, as will be hereinafter described.

It will be evident from the above description that a filter constructed as herein described is capable of use without washing for a much longer period of time than prior constructions, thereby effecting a great saving both in labor and in the water used for washing. Furthermore, the capacity of the filter is greatly increased, as by distributing the impurities more or less uniformly throughout the bed and preventing the formation of a thick crust at the upper surface the water is caused to pass much more rapidly through the bed without interfering with successful filtration.

The maintaining of a partial vacuum in the filter-bed, as above described, further improves the operation of the filter and increases its efficiency by effecting the coagulation of the suspended impurities, such coagulation being effected by the separation and concentration of the air contained in the water under filtration, thus increasing the bulk of such impurities and enabling the filter-bed to intercept and retain them. The air separated from the water remains to a great extent in the filter-bed and is especially useful in washing the bed, as when the current of water is reversed in washing, as hereinafter described, the air rising through the filter bed causes a violent agitation thereof, liberating the accumulated impurities and permitting them to be carried up with the wash-water to the overflow. In filters of this class daily washing is usually required, while the sediment in the subsiding-chamber may accumulate for a month or more before its removal is necessary. The daily wash is performed by closing the valve to the subsiding-chamber, filtering the water down, closing the valve in the pure-water pipe, and opening connection therewith to the wash-water, stand-pipe or pump, forcing the water up through the filter-bed, during which the agitator is kept in motion and the washed-out impurities flow over the top of the material-tank into the annular space surrounding it and pass out through the valve-opening at the bottom thereof. The wash-water is prevented from getting into the subsiding-chamber by the central pipe, which projects above the top of the material-tank for this purpose. The wash is completed by closing the valve of the annular space and permitting the first filtered water to pass out into the sewer instead of the pure-water reservoir. As soon as the downdraft again becomes effective the filter-bed is at once compacted to such an extent that it is necessary to draw off only a very small amount of water after washing. To remove the sediment from the subsiding-chamber, the contained water is first drawn off and the wash-water is admitted to the filter from the stand-pipe, as for the daily wash, which may be carried on at the same time, as described, except that the filter-tank outlet-valve is kept closed, thereby raising the water therein to a higher plane and above the top of the central-opening pipe, down which the water falls with considerable force, aided centrifugally by the revolution of the elbow upon the agitator-shaft, thus flushing the chamber and driving the sediment therefrom through the outlet-opening and making use of the filter wash-water for the purpose, whereby a saving of water is effected. It will be noticed that the elbow is perforated for a stream of water to strike the tank at the bottom. Any number of such may be used at various angles, if desired. It will also be noticed that revolving the elbow, as is necessary during the daily wash or at any other time with a full tank, does not tend to stir or draw up the sediment, but rather the opposite effect, the sediment being driven away thereby.

Heretofore filter and subsiding tanks have been formed separate and set upon independent foundations with outside connection and the sediment removed from the subsiding-tank principally by manual labor. My invention requires but one-half the floor-space and foundation, while the sediment is mechanically removed, thereby securing a large reduction in the cost of construction and operating expenses with economy of water consumption.

I am aware that filters have been submerged within a tank or water-cooler, a space being left between and around the filter, in which the tank or cooler is primarily a subsiding-tank to the extent of the said between-space. Such is not my invention. In my invention the filter-tank is supplied from the subsiding-tank through a central pipe vertically elevated above the subsiding-tank and above the superimposed filter-bed, through which central pipe little, if any, non-floating sediment can possibly find its way to the filter-bed.

It is obvious that the character of my invention would not be materially changed by connecting the subsiding-chamber by means of pipes leading therefrom either upon the inside or outside of the tanks and discharging above the top of the filter-bed, and by having the agitator-shaft extended through a stuffing-box bearing, with an auxiliary shaft and agitator in the subsiding-chamber adapted to be coupled and uncoupled therefrom to stir up the sediment, and with a valved water communication between the annular space and subsiding-chamber to wash out the sediment therefrom when stirred up, as will be readily understood, and I do not therefore desire to have my invention restricted to the exact form and arrangement of the parts shown herein.

That which I claim as my invention, and desire to secure by Letters Patent, is—

1. In a filter, the combination of a filter-tank, a subsiding-tank, and a filter-material-holding tank, formed as described, with a central communicating passage or opening between said tanks, an agitator for said filter, the shaft of which passes through said central opening, and projects into said subsiding-chamber, and a pipe-elbow rigidly secured to said shaft, and adapted to be rotated thereby, to give force and direction to the water passing down through said central opening and elbow, for flushing out and removing the sediment from said subsiding-chamber, substantially as set forth.

2. A filter consisting of a filter-tank, a pure-water pipe communicating with the lower portion thereof, a granular filter-bed in said tank, the lower portion of said filter-bed being compacted more closely than the upper portion thereof, means for maintaining a partial vacuum in said filter-bed during filtration, and means for reversing the flow of water through said filter-bed, substantially as described.

3. A filter consisting of a filter-tank, a pure-water pipe communicating with the lower portion thereof, a granular filter-bed in said tank, means for maintaining a partial vacuum in said filter-bed during filtration, and agitators adapted to agitate the upper portion of the bed, substantially as described.

OMAR H. JEWELL.

Witnesses:
JOHN L. JACKSON,
ALBERT H. ADAMS.